US011381317B2

(12) United States Patent
Okamoto et al.

(10) Patent No.: US 11,381,317 B2
(45) Date of Patent: Jul. 5, 2022

(54) OPTICAL RECEIVING APPARATUS AND WAVEFORM DISTORTION COMPENSATION METHOD

(71) Applicant: NIPPON TELEGRAPH AND TELEPHONE CORPORATION, Tokyo (JP)

(72) Inventors: Seiji Okamoto, Musashino (JP); Yoshiaki Kisaka, Musashino (JP); Masanori Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/420,845

(22) PCT Filed: Jan. 6, 2020

(86) PCT No.: PCT/JP2020/000053
§ 371 (c)(1),
(2) Date: Jul. 6, 2021

(87) PCT Pub. No.: WO2020/145237
PCT Pub. Date: Jul. 16, 2020

(65) Prior Publication Data
US 2022/0094440 A1    Mar. 24, 2022

(30) Foreign Application Priority Data
Jan. 9, 2019   (JP) .............................. JP2019-001658

(51) Int. Cl.
*H04B 10/2513* (2013.01)
*H04B 10/61* (2013.01)

(52) U.S. Cl.
CPC ....... *H04B 10/615* (2013.01); *H04B 10/2513* (2013.01)

(58) Field of Classification Search
None
See application file for complete search history.

(56) References Cited

U.S. PATENT DOCUMENTS 6,487,352 B1 *  11/2002  Sobiski ............. H04B 10/2569
                                                    398/147
7,173,983 B1 *   2/2007  Meyer ................ H04L 27/2665
                                                    375/340

(Continued)

OTHER PUBLICATIONS

K.-P. Ho, Subband equaliser for chromatic dispersion of optical fibre, Electronics Letters, vol. 45, No. 24, 2009.

(Continued)

*Primary Examiner* — Jai M Lee

(57) ABSTRACT

An optical receiving device that divides receive signals obtained by receiving an optical signal using a coherent detection scheme into a plurality of frequency bands, matches timing of the receive signals along a time axis between the frequency bands resulting from the division, performs a combining process of combining the receive signals contained in the plurality of frequency bands, and compensates the receive signals for waveform distortion either before or after the combining process, includes: a first wavelength dispersion compensation unit adapted to compensate the receive signals for waveform distortion in each of the frequency bands resulting from the division; a first nonlinear compensation unit adapted to compensate the receive signals belonging to each of the frequency bands and timed with each other in a time domain for a nonlinear optical effect; and a second wavelength dispersion compensation unit adapted to compensate the receive signals belonging to each of the frequency bands and compensated for the nonlinear optical effect for wavelength dispersion in each of the frequency bands.

5 Claims, 11 Drawing Sheets

(56) References Cited

U.S. PATENT DOCUMENTS

| | | | |
|---|---|---|---|
| 8,472,814 B2* | 6/2013 | Zhang | H04B 10/6161 |
| | | | 398/208 |
| 9,531,480 B2* | 12/2016 | Xie | H04B 10/6161 |
| 9,686,020 B2* | 6/2017 | Mochizuki | H04B 10/6161 |
| 10,193,593 B2* | 1/2019 | Yasuda | H04L 27/01 |
| 10,868,617 B2* | 12/2020 | Yoshida | H04B 10/6161 |

OTHER PUBLICATIONS

Ezra Ip and Joseph M. Kahn, Compensation of Dispersion and Nonlinear Impairments Using Digital Backpropagation, Journal of Lightwave Technology, vol. 26, No. 20, 2008, pp. 3416-3425.

* cited by examiner

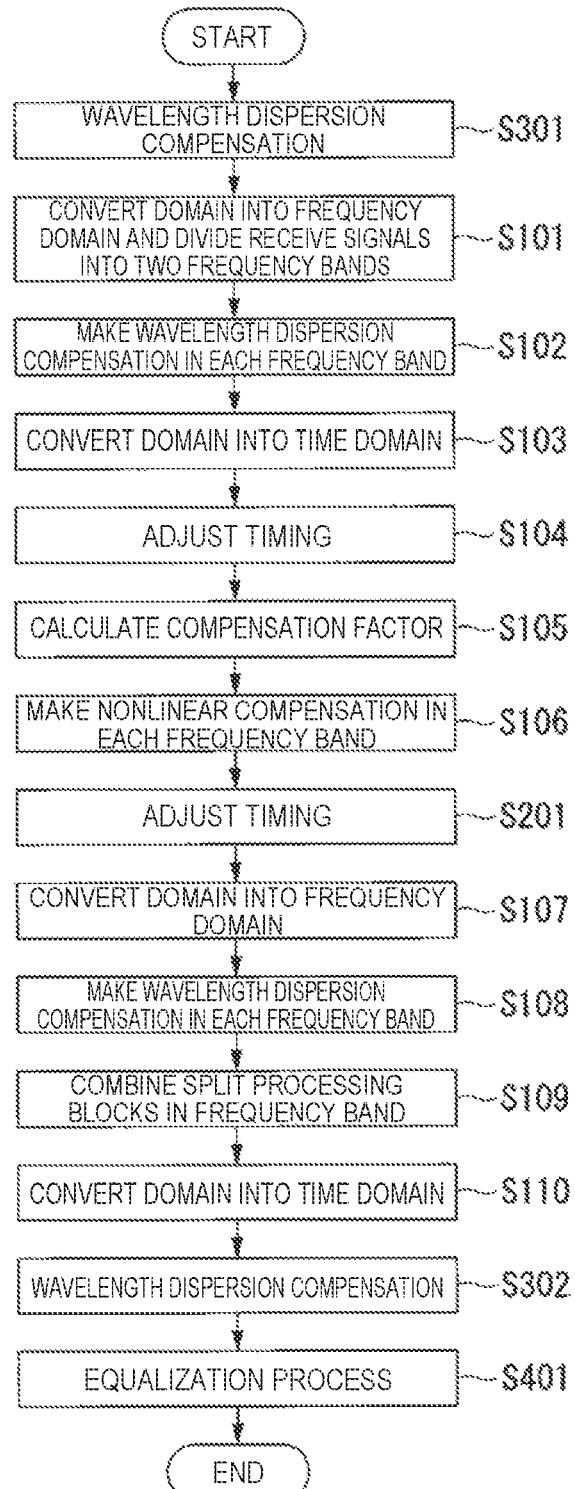

OPTICAL RECEIVING APPARATUS AND WAVEFORM DISTORTION COMPENSATION METHOD

CROSS-REFERENCE TO RELATED APPLICATIONS

This application is a 371 U.S. National Phase of International Application No. PCT/JP2020/000053 filed on Jan. 6, 2020, which claims priority to Japanese Application No. 2019-001658 filed on Jan. 9, 2019. The entire disclosures of the above applications are incorporated herein by reference.

TECHNICAL FIELD

The present invention relates to an optical receiving device and a waveform distortion compensation method.

BACKGROUND ART

In optical communications, it is known that a waveform of an optical signal is distorted by a wavelength dispersion effect of an optical fiber in a process in which the optical signal propagates through the optical fiber (see, for example, Non-Patent Literature 1). The wavelength dispersion is a phenomenon that occurs because propagation velocity through the optical fiber varies depending on the wavelength and the longer the optical fiber, the greater the effect of the wavelength dispersion.

Conventionally, compensation for waveform distortion caused by wavelength dispersion is made using a dispersion compensation fiber opposite in wavelength dispersion characteristics to an optical fiber of an optical transmission line. In contrast, with recent coherent optical communications, wavelength dispersion compensation has come to be made by digital signal processing using phase information obtained on a receiving end.

As a conventional compensation method for waveform distortion, a digital backpropagation method is proposed that involves making wavelength dispersion compensation in a frequency domain using a fast Fourier transform (hereinafter referred to as "FFT") and then compensating for a nonlinear optical effect in a time domain using an inverse fast Fourier transform (hereinafter referred to as "IFFT") (see, for example, Non-Patent Literature 2).

CITATION LIST

Non-Patent Literature

Non-Patent Literature 1: K.-P. Ho, "Subband equaliser for chromatic dispersion of optical fibre", ELECTRONICS LETTERS, Vol. 45, No. 24, 2009.
Non-Patent Literature 2: Ezra Ip and Joseph M. Kahn, "Compensation of Dispersion and Nonlinear Impairments Using Digital Backpropagation", JOURNAL OF LIGHTWAVE TECHNOLOGY, VOL. 26, NO. 20, 2008, p. 3416-3425.

SUMMARY OF THE INVENTION

Technical Problem

With the digital backpropagation method, the larger the iteration count of the compensation, the higher the compensation accuracy. However, there is a problem in that to make the compensation repeatedly, plural FFT and IFFT circuits are necessary, increasing the circuit scale needed to compensate for waveform distortion with high accuracy.

In view of the above circumstances, the present invention has an object to provide a technique capable of compensating for waveform distortion with high accuracy while limiting a circuit scale.

Means for Solving the Problem

According to one aspect of the present invention, there is provided an optical receiving device that divides receive signals obtained by receiving an optical signal using a coherent detection scheme into a plurality of frequency bands, matches timing of the receive signals along a time axis between the frequency bands resulting from the division, performs a combining process of combining the receive signals contained in the plurality of frequency bands, and compensates the receive signals for waveform distortion either before or after the combining process, the optical receiving device comprising: a first wavelength dispersion compensation unit adapted to compensate the receive signals for waveform distortion in each of the frequency bands resulting from the division; a first nonlinear compensation unit adapted to compensate the receive signals belonging to each of the frequency bands and timed with each other in a time domain for a nonlinear optical effect; and a second wavelength dispersion compensation unit adapted to compensate the receive signals belonging to each of the frequency bands and compensated for the nonlinear optical effect for wavelength dispersion in each of the frequency bands.

According to another aspect of the present invention, the optical receiving device further comprises: a first delay unit adapted to match timing along a time axis between the receive signals in each of the frequency bands in a stage preceding the first nonlinear compensation unit; and a second delay unit adapted to match timing along a time axis between the receive signals belonging to each of the frequency bands and compensated for the nonlinear optical effect.

According to another aspect of the present invention, the optical receiving device further comprises: a second nonlinear compensation unit adapted to compensate the receive signals for the nonlinear optical effect before the receive signals are divided; and a third nonlinear compensation unit adapted to compensate the receive signals for the nonlinear optical effect after the combining process.

According to another aspect of the present invention, the optical receiving device further comprises an adaptive equalization unit adapted to perform an adaptive equalization process on the receive signals after the combining process.

According to another aspect of the present invention, there is provided a waveform distortion compensation method performed by an optical receiving device that divides receive signals obtained by receiving an optical signal using a coherent detection scheme into a plurality of frequency bands, matches timing of the receive signals along a time axis between the frequency bands resulting from the division, performs a combining process of combining the receive signals contained in the plurality of frequency bands, and compensates the receive signals for waveform distortion either before or after the combining process, the method comprising: a first wavelength dispersion compensation step of compensating the receive signals for waveform distortion in each of the frequency bands resulting from the division; a first nonlinear compensation step of compensating the receive signals belonging to each of the frequency bands and timed with each other in a time domain for a nonlinear optical effect; and a second wavelength dispersion compensation step of compensating the receive signals belonging to each of the frequency bands and compensated for the nonlinear optical effect for wavelength dispersion in each of the frequency bands.

Effects of the Invention

The present invention makes it possible to compensate for waveform distortion with high accuracy while limiting a circuit scale.

BRIEF DESCRIPTION OF DRAWINGS

FIG. 11 is a flowchart showing a process flow of the optical receiving device according to the fourth embodiment.

DESCRIPTION OF EMBODIMENTS

An embodiment of the present invention will be described below with reference to the drawings.

First Embodiment

Figure 1:
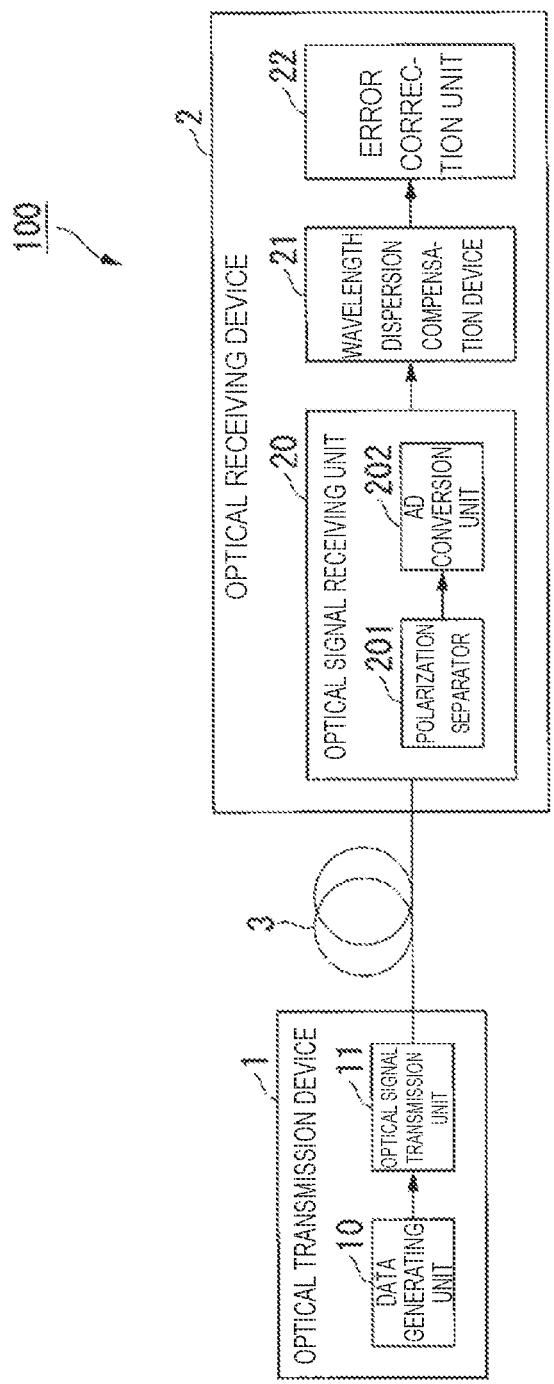
FIG. 1 is a diagram showing a system configuration of an optical transmission system according to a first embodiment.

FIG. 1 is a diagram showing a system configuration of an optical transmission system 100 according to a first embodiment. The optical transmission system 100 includes an optical transmission device 1 and an optical receiving device 2. The optical transmission device 1 and optical receiving device 2 are connected with each other, being ready to communicate via an optical transmission line 3. The optical transmission line 3 transmits an optical signal sent from the optical transmission device 1, to the optical receiving device 2. The optical transmission line 3 is made up of an optical fiber interconnecting the optical transmission device 1 and optical receiving device 2.

The optical transmission device 1 includes a data generating unit 10 and an optical signal transmission unit 11.

The data generating unit 10 captures transmission information from an external information source, encodes the captured transmit information, and thereby generates an electric signal.

The optical signal transmission unit 11 converts the electric signal generated by the data generating unit 10 into an optical signal and transmits the optical signal to the optical receiving device 2.

The optical receiving device 2 includes an optical signal receiving unit 20, a wavelength dispersion compensation device 21, and an error correction unit 22.

The optical signal receiving unit 20 includes a polarization separator 201 and an AD conversion unit 202. In the optical signal receiving unit 20, the polarization separator 201 separates an optical signal into two orthogonal polarization components. The optical signal and locally emitted light from a local emission source (not shown) are input to a 90-degree hybrid circuit (not shown), and consequently a total of four output lights are obtained: a pair of output lights obtained by causing the optical signal and locally emitted light to interfere with each other in phase and in opposite phase, and a pair of output lights obtained by causing the optical signal and locally emitted light to interfere with each other orthogonally (at 90 degrees) and inversely orthogonally (at −90 degrees). These output lights are converted into respective analog signals by photodiodes (not shown). The analog signals are converted into receive signals, which are digital signals, by the AD conversion unit 202. The AD conversion unit 202 outputs the receive signals, which are digital signals, to the wavelength dispersion compensation device 21.

When an optical signal propagates through the optical transmission line 3, a signal waveform is distorted by wavelength dispersion. The wavelength dispersion compensation device 21 captures the digital signals outputted by the AD conversion unit 202, as receive signals, and compensates the captured receive signals for wavelength dispersion. Specifically, the wavelength dispersion compensation device 21 estimates magnitude of signal waveform distortions from the receive signals and compensates the receive signals for distortion due to wavelength dispersion.

The error correction unit 22 applies error corrections to the receive signals based on an error correcting code system. Then, the error correction unit 22 externally outputs the receive signals subjected to the error corrections, i.e., receipt information corresponding to transmit information.

Figure 2:
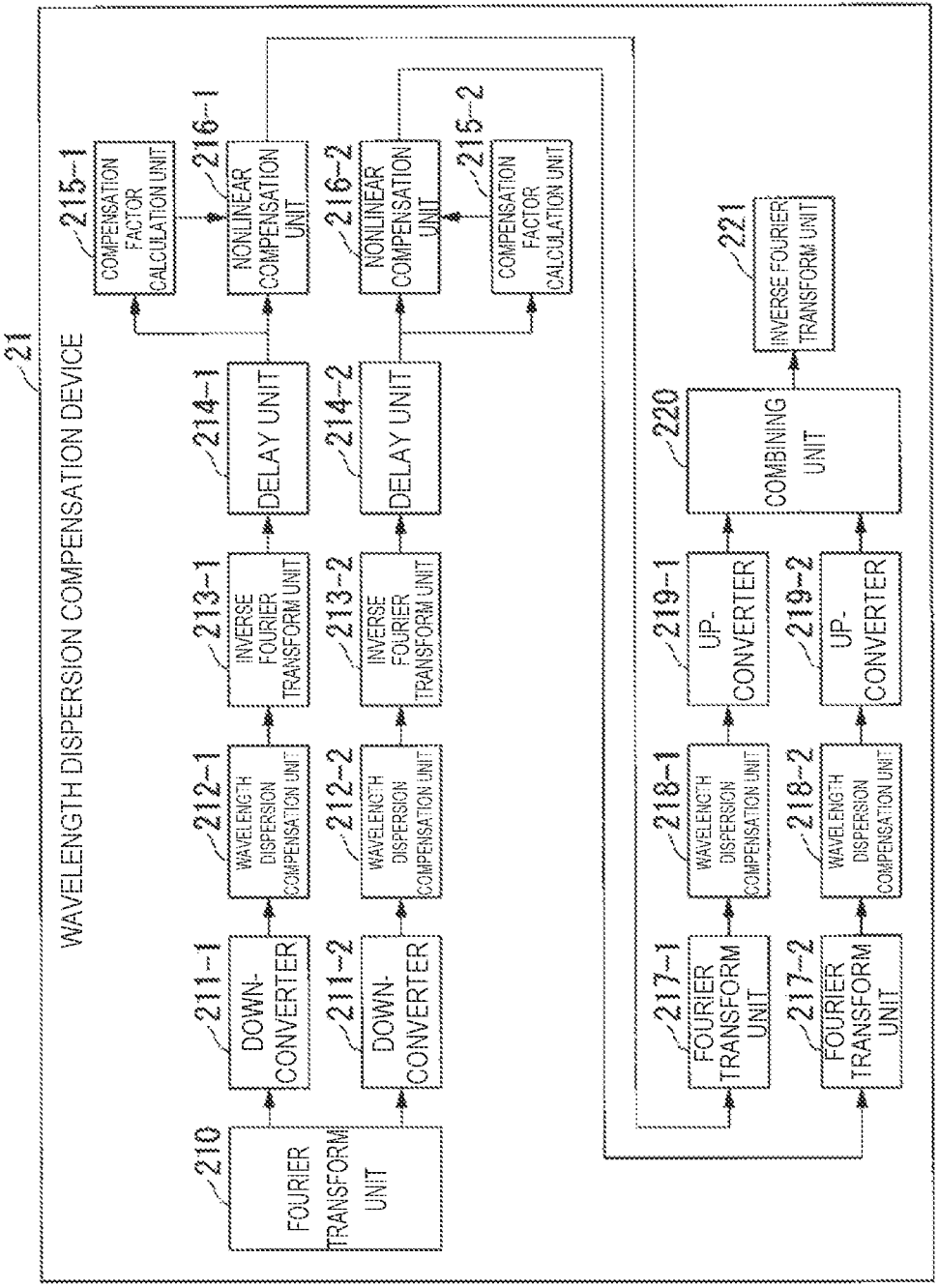
FIG. 2 is a schematic block diagram showing a functional configuration of a wavelength dispersion compensation device according to the first embodiment.

FIG. 2 is a schematic block diagram showing a functional configuration of the wavelength dispersion compensation device 21 according to the first embodiment.

The wavelength dispersion compensation device 21 includes a Fourier transform unit 210, downconverters 211-1 and 211-2, wavelength dispersion compensation units 212-1 and 212-2, inverse Fourier transform units 213-1 and 213-2, delay units 214-1 and 214-2, compensation factor calculation units 215-1 and 215-2, nonlinear compensation units 216-1 and 216-2, Fourier transform units 217-1 and 217-2, wavelength dispersion compensation units 218-1 and 218-2, upconverters 219-1 and 219-2, a combining unit 220, and an inverse Fourier transform unit 221.

The Fourier transform unit 210 performs the FFT of receive signals in the time domain and thereby converts the receive signals in the time domain into receive signals in the frequency domain. Also, the Fourier transform unit 210 divides the receive signals in the frequency domain into plural frequency bands, and outputs groups of the frequency bands resulting from the division as split processing blocks to the downconverters 211-1 and 211-2.

The downconverter 211-1 captures a split processing block of a positive frequency band outputted by the Fourier transform unit 210. The downconverter 211-1 downconverts the frequency of the captured split processing block.

The downconverter 211-2 captures a split processing block of a negative frequency band outputted by the Fourier transform unit 210. The downconverter 211-2 downconverts the frequency of the captured split processing block.

The wavelength dispersion compensation unit 212-1 makes a wavelength dispersion compensation by multiplying the split processing block outputted from the downconverter 211-1 by an inverse transfer function whose phase rotation axis is the center of the frequency band.

The wavelength dispersion compensation unit 212-2 makes a wavelength dispersion compensation by multiplying the split processing block outputted from the downconverter 211-2 by an inverse transfer function whose phase rotation axis is the center of the frequency band. Here, the inverse transfer function is a transfer function opposite in characteristics to a transfer function that represents characteristics of wavelength dispersion experienced by an optical signal during propagation through the optical fiber of the optical transmission line 3 and is approximated by a quadratic function. The wavelength dispersion compensation units 212-1 and 212-2 are a form of a first wavelength dispersion compensation unit.

The inverse Fourier transform unit 213-1 performs the IFFT of the split processing block outputted from the wavelength dispersion compensation unit 212-1 and thereby converts the receive signals contained in the split processing block compensated for wavelength dispersion into receive signals in the time domain.

The inverse Fourier transform unit 213-2 performs the IFFT of the split processing block outputted from the wavelength dispersion compensation unit 212-2 and thereby converts the receive signals contained in the split processing block compensated for wavelength dispersion into receive signals in the time domain.

The delay unit 214-1 assigns a delay to the split processing block outputted from the inverse Fourier transform unit 213-1 and matches timing along a time axis between the plural split processing blocks. The delay unit 214-2 assigns a delay to the split processing block outputted from the inverse Fourier transform unit 213-2 and matches timing along a time axis between the plural split processing blocks. Also, the delay units 214-1 and 214-2 output the receive signals contained in the split processing blocks timed with each other as a temporarily continuous signal sequence to the compensation factor calculation units 215-1 and 215-2 and nonlinear compensation units 216-1 and 216-2. The delay units 214-1 and 214-2 are a form of a first delay unit.

Based on the signal sequence outputted from the delay unit 214-1, the compensation factor calculation unit 215-1 calculates a factor for use in a process to be performed by the nonlinear compensation unit 216-1.

Based on the signal sequence outputted from the delay unit 214-2, the compensation factor calculation unit 215-2 calculates a factor for use in a process to be performed by the nonlinear compensation unit 216-2.

The nonlinear compensation unit 216-1 compensates the signal sequence of the split processing block outputted from the delay unit 214-1 for a nonlinear optical effect using the factor calculated by the compensation factor calculation unit 215-1.

The nonlinear compensation unit 216-2 compensates the signal sequence of the split processing block outputted from the delay unit 214-2 for a nonlinear optical effect using the factor calculated by the compensation factor calculation unit 215-2. The nonlinear compensation units 216-1 and 216-2 are a form of a first nonlinear compensation unit.

Using an FFT, the Fourier transform unit 217-1 converts the receive signals in the time domain contained in the split processing block outputted by the nonlinear compensation unit 216-1 into receive signals in the frequency domain.

Using an FFT, the Fourier transform unit 217-2 converts the receive signals in the time domain contained in the split processing block outputted by the nonlinear compensation unit 216-2 into receive signals in the frequency domain.

The wavelength dispersion compensation unit 218-1 makes a wavelength dispersion compensation by multiplying the split processing block outputted from the Fourier transform unit 217-1 by an inverse transfer function whose phase rotation axis is the center of the frequency band.

The wavelength dispersion compensation unit 218-2 makes a wavelength dispersion compensation by multiplying the split processing block outputted from the Fourier transform unit 217-2 by an inverse transfer function whose phase rotation axis is the center of the frequency band. The wavelength dispersion compensation units 218-1 and 218-2 are a form of a second wavelength dispersion compensation unit.

The upconverter 219-1 upconverts the frequencies of the split processing block outputted by the wavelength dispersion compensation unit 218-1.

The upconverter 219-2 upconverts the frequencies of the split processing block outputted by the wavelength dispersion compensation unit 218-2.

The combining unit 220 combines the split processing blocks outputted, respectively, by the upconverters 219-1 and 219-2, such that the split processing blocks will be continuous with each other on a frequency axis, and thereby generates one processing block.

The inverse Fourier transform unit 221 performs the IFFT of the processing block outputted from the combining unit 220 and thereby converts the receive signals contained in the processing block into receive signals in the time domain.

Figure 3:
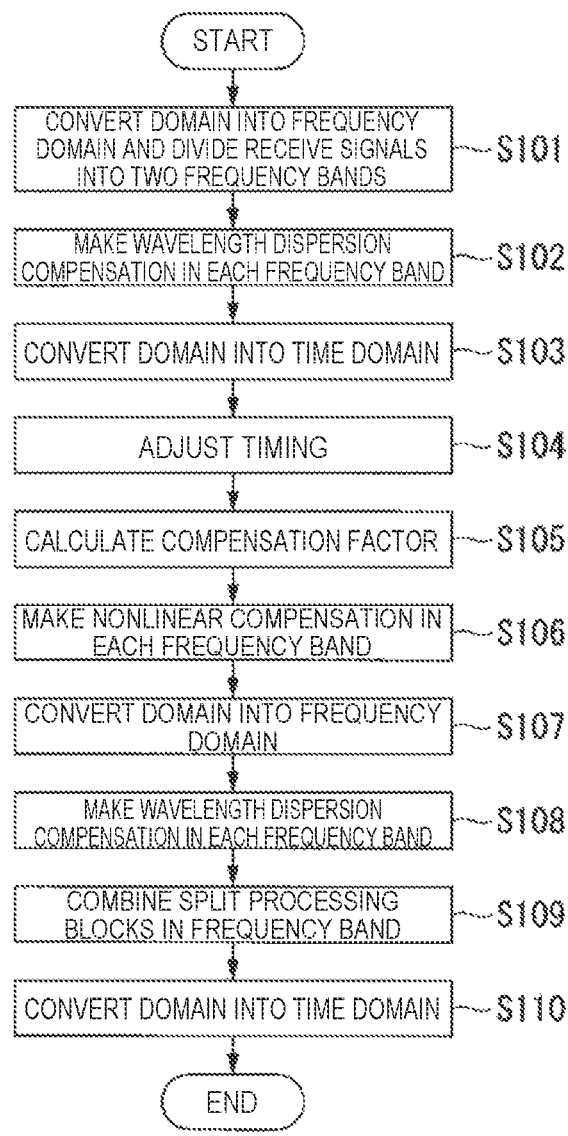
FIG. 3 is a flowchart showing a process flow of the wavelength dispersion compensation device according to the first embodiment.

FIG. 3 is a flowchart showing a process flow of the wavelength dispersion compensation device 21 according to the first embodiment.

The Fourier transform unit 210 performs the FFT of the receive signals in the time domain and thereby converts receive signals in the time domain into receive signals in the frequency domain. Subsequently, the Fourier transform unit 210 divides the receive signals in the frequency domain into plural frequency bands, and generates the frequency bands resulting from the division as split processing blocks (step S101). Specifically, the Fourier transform unit 210 divides the receive signals in the frequency domain into two frequency bands—a positive frequency band and negative frequency band—with reference to a center frequency and thereby generates a split processing block made up of the entire positive frequency band and a split processing block made up of the entire negative frequency band. The Fourier transform unit 210 outputs one of the split processing blocks to the downconverter 211-1 and outputs the other split processing block to the downconverter 211-2.

The downconverter 211-1 downconverts the frequency of the split processing block outputted from the Fourier transform unit 210. The downconverter 211-1 outputs the downconverted split processing block to the wavelength dispersion compensation unit 212-1. The downconverter 211-2 downconverts the frequency of the split processing block outputted from the Fourier transform unit 210. The downconverter 211-2 outputs the downconverted split processing block to the wavelength dispersion compensation unit 212-2.

The wavelength dispersion compensation unit 212-1 makes a wavelength dispersion compensation by multiplying the receive signals in the frequency domain contained in the split processing block by an inverse transfer function whose phase rotation axis is the center of the frequency band common throughout the split processing block (step S102). An amount of the wavelength dispersion compensation depends on the optical transmission line 3. Thus, the wavelength dispersion compensation unit 212-1 makes half the total required amount of compensation in each band. Note that the amount of the wavelength dispersion compensation made by the wavelength dispersion compensation unit 212-1 does not have to be one half. The wavelength dispersion compensation unit 212-1 outputs the split processing block subjected to the wavelength dispersion compensation to the inverse Fourier transform unit 213-1.

As with the wavelength dispersion compensation unit 212-1, the wavelength dispersion compensation unit 212-2 makes a wavelength dispersion compensation by multiplying the receive signals in the frequency domain contained in each split processing block by an inverse transfer function whose phase rotation axis is the center of the frequency band common throughout the split processing block. For example, the wavelength dispersion compensation unit 212-2 makes half the total required amount of compensation in each band. Note that the amount of the wavelength dispersion compensation made by the wavelength dispersion compensation unit 212-2 does not have to be one half. The wavelength dispersion compensation unit 212-2 outputs the split processing block subjected to the wavelength dispersion compensation to the inverse Fourier transform unit 213-2.

As an example of division into two parts, when the wavelength dispersion compensation is made per one half the amount, the size of the first large FFT is 4, the first IFFT is 2, the second FFT is 1, and the last IFFT is 2. This is because whereas the first set of FFT and IFFT needs to be large enough in size to compensate for all the wavelength dispersion, it is sufficient that the second set of FFT and IFFT is large enough in size to compensate for one half the amount. Note that in the case of division into n parts, the size ratio among FFT1, IFFT1, FFT2, and IFFT2 is 4n:2:1:2n.

Using an IFFT, the inverse Fourier transform unit 213-1 converts the receive signals in the frequency domain contained in the split processing block compensated for wavelength dispersion by the wavelength dispersion compensation unit 212-1 into receive signals in the time domain (step S103). The inverse Fourier transform unit 213-1 outputs the split processing block with the receive signals converted into receive signals in the time domain to the delay unit 214-1. As with the inverse Fourier transform unit 213-1, the inverse Fourier transform unit 213-2 converts the receive signals in the frequency domain contained in the split processing block compensated for wavelength dispersion by the wavelength dispersion compensation unit 212-2 into receive signals in the time domain. The inverse Fourier transform unit 213-2 outputs the split processing block with the receive signals converted into receive signals in the time domain to the delay unit 214-2.

The delay unit 214-1 assigns a delay to the split processing block outputted from the inverse Fourier transform unit 213-1 and matches timing along the time axis (step S104). The delay unit 214-1 outputs the receive signals contained in the timed split processing block as a continuous signal sequence to the compensation factor calculation unit 215-1 and nonlinear compensation unit 216-1.

As with the delay unit 214-1, the delay unit 214-2 assigns a delay to the split processing block outputted from the inverse Fourier transform unit 213-2 and matches timing along the time axis. The delay unit 214-2 outputs the receive signals contained in the timed split processing block as a continuous signal sequence to the compensation factor calculation unit 215-2 and nonlinear compensation unit 216-2.

Based on the signal sequence outputted from the delay unit 214-1, the compensation factor calculation unit 215-1 calculates a factor for use in a process to be performed by the nonlinear compensation unit 216-1 (step S105). Specifically, the compensation factor calculation unit 215-1 calculates phase rotation proportional to sampled power as the factor for use in the process to be performed by the nonlinear compensation unit 216-1. The compensation factor calculation unit 215-1 outputs the calculated factor to the nonlinear compensation unit 216-1. Note that the samples used may be instantaneous power samples or a power sample group taken by the application of a low-pass filters having multiple taps. As a simplified means, power may be calculated in each sub-band resulting from division, but power in a sub-band does not take components in other sub-bands into consideration. This makes the sampled power different from the power during actual transmission. Thus, to use the power in the entire signal band, the compensation factor calculation unit 215-1 may calculate the nonlinear compensation factor using power over the entire band. Alternatively, the compensation factor calculation unit 215-1 may use part of a band close to the appropriate band rather than using the entire band. As with the compensation factor calculation unit 215-1, the compensation factor calculation unit 215-2 calculates a factor for use in a process to be performed by the nonlinear compensation unit 216-2, based on the signal sequence outputted from the delay unit 214-2. The compensation factor calculation unit 215-2 outputs the calculated factor to the nonlinear compensation unit 216-2.

Figure 4:
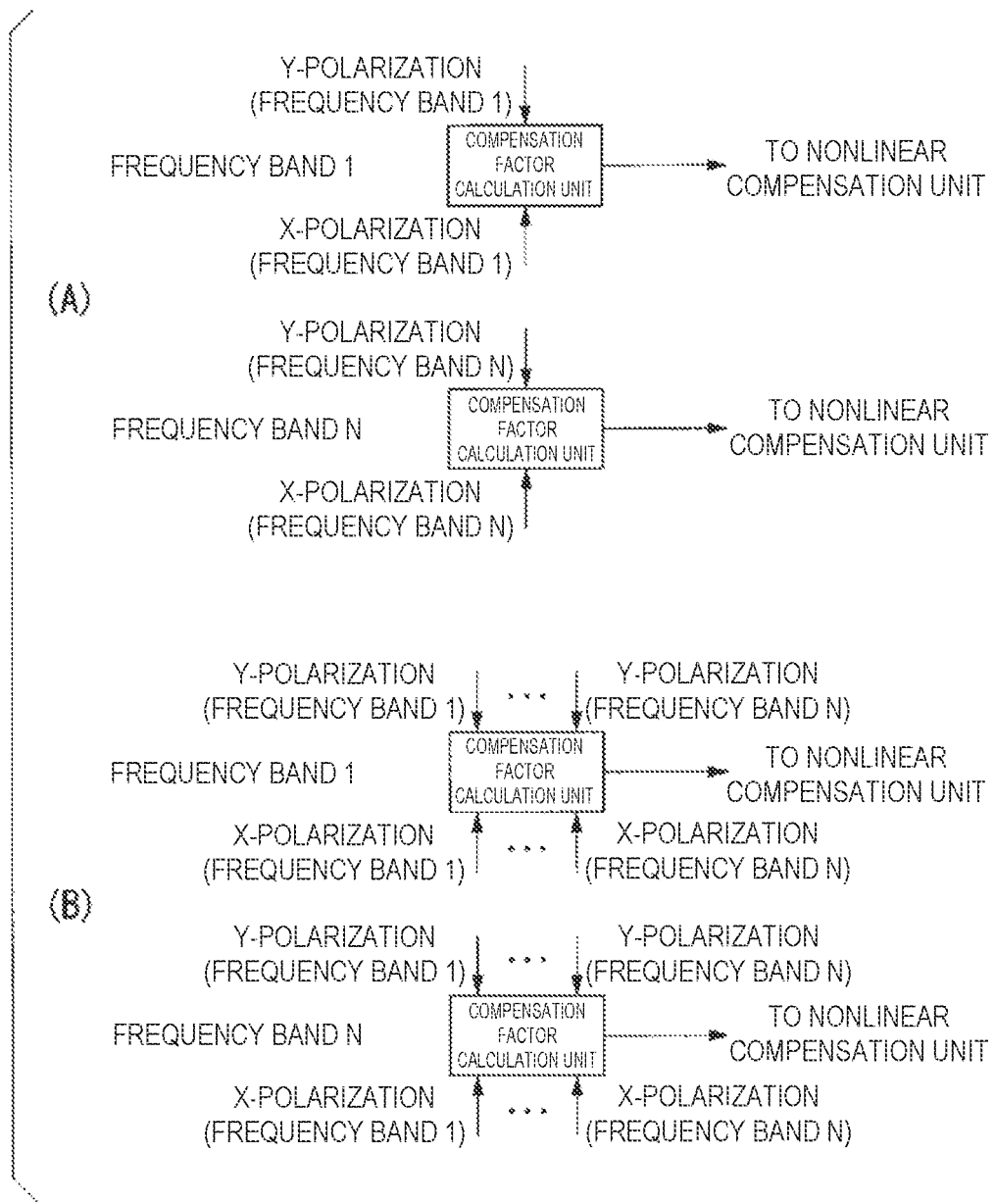
FIGS. 4(A) and 4(B) are diagrams for explaining processes performed by a compensation factor calculation unit according to the first embodiment.

FIGS. 4(A) and 4(B) are diagrams for explaining processes performed by a compensation factor calculation unit according to the first embodiment. FIG. 4(A) shows an example in which the factor is calculated using only the power in individual bands (bands 1 to N, where N is an integer equal to or larger than 2) and FIG. 4(B) shows an example in which the factor is calculated using the power in all the bands.

As shown in FIG. 4(A), when the factor is calculated using only the power in individual bands, the compensation factor calculation unit 215 captures X-polarized and Y-polarized signals in a specific band (e.g., band 1) and calculates the electric power in the specific band (e.g., band 1) from the captured X-polarized and Y-polarized signals. Then, the compensation factor calculation unit 215 calculates phase rotation proportional to the calculated electric power as a factor for use in the process to be performed by the nonlinear compensation unit 216.

As shown in FIG. 4(B), when the factor is calculated using the power in all the bands, the compensation factor calculation unit 215 captures X-polarized and Y-polarized signals in all the bands, and calculates the electric power in all the bands from the captured X-polarized and Y-polarized signals in all the bands. Then, the compensation factor calculation unit 215 calculates phase rotation proportional to the calculated electric power as a factor for use in the process to be performed by the nonlinear compensation unit 216.

Description will be continued by returning to FIG. 3.

The nonlinear compensation unit 216-1 compensates the signal sequence of the split processing block outputted from the delay unit 214-1 for a nonlinear optical effect using the factor calculated by the compensation factor calculation unit 215-1 (step S106). Regarding a concrete process of the compensation for the nonlinear optical effect, a technique shown in Non-Patent Literature 2 may be used. For example, the nonlinear compensation unit 216-1 compensates for the nonlinear optical effect using Expression (8) of Non-Patent Literature 2. The nonlinear compensation unit 216-1 outputs the split processing block compensated for the nonlinear optical effect to the Fourier transform unit 217-1.

As with the nonlinear compensation unit 216-1, the nonlinear compensation unit 216-2 compensates the signal sequence of the split processing block outputted from the delay unit 214-2 for a nonlinear optical effect using the factor calculated by the compensation factor calculation unit 215-2. The nonlinear compensation unit 216-2 outputs the split processing block compensated for the nonlinear optical effect to the Fourier transform unit 217-2.

Using an FFT, the Fourier transform unit 217-1 converts the receive signals in the time domain contained in the split processing block outputted by the nonlinear compensation unit 216-1 into receive signals in the frequency domain (step S107). The Fourier transform unit 217-1 outputs the split processing block with the receive signals converted into receive signals in the frequency domain to the wavelength dispersion compensation unit 218-1. Using an FFT, the Fourier transform unit 217-2 converts the receive signals in the time domain contained in the split processing block outputted by the nonlinear compensation unit 216-2 into receive signals in the frequency domain. The Fourier transform unit 217-2 outputs the split processing block with the receive signals converted into receive signals in the frequency domain to the wavelength dispersion compensation unit 218-2.

The wavelength dispersion compensation unit 218-1 makes a wavelength dispersion compensation by multiplying the split processing block outputted from the Fourier transform unit 217-1 by an inverse transfer function whose phase rotation axis is the center of the frequency band (step S108). The wavelength dispersion compensation unit 218-1 outputs the split processing block subjected to the wavelength dispersion compensation to the upconverter 219-1. The wavelength dispersion compensation unit 218-2 makes a wavelength dispersion compensation by multiplying the split processing block outputted from the Fourier transform unit 217-2 by an inverse transfer function whose phase rotation axis is the center of the frequency band. The wavelength dispersion compensation unit 218-2 outputs the split processing block subjected to the wavelength dispersion compensation to the upconverter 219-2.

The upconverter 219-1 upconverts the frequency of the split processing block outputted from the wavelength dispersion compensation unit 218-1. The upconverter 219-1 outputs the upconverted split processing block to the combining unit 220. The upconverter 219-2 upconverts the frequency of the split processing block outputted from the wavelength dispersion compensation unit 218-2. The upconverter 219-2 outputs the upconverted split processing block to the combining unit 220.

The combining unit 220 combines the split processing blocks outputted, respectively, from the upconverters 219-1 and 219-2, such that the split processing blocks will be continuous with each other on a frequency axis, and thereby generates one processing block (step S109). The combining unit 220 outputs the generated processing block to the inverse Fourier transform unit 221. The inverse Fourier transform unit 221 performs the IFFT of the split processing block outputted from the combining unit 220 and thereby converts the receive signals contained in the processing blocks into receive signals in the time domain (step S110).

With the addition of the nonlinear compensation units 216 and wavelength dispersion compensation units 218 to the wavelength dispersion compensation device 21, the optical receiving device 2 according to the first embodiment configured as described above can implement a digital backpropagation method without the addition of any Fourier transform unit or inverse Fourier transform unit. Also, in the optical receiving device 2 according to the first embodiment, the nonlinear compensation units 216 are added between IFFT and FFT processes needed for compensation for band division. Furthermore, if dispersion compensation and nonlinear compensation make up one step, the present invention can implement a 1.5-step digital backpropagation method. Therefore, the optical receiving device 2 according to the first embodiment enables high-accuracy waveform distortion compensation without needing much increase in a circuit scale. Thus, the optical receiving device 2 according to the first embodiment can compensate for waveform distortion with high accuracy while limiting the circuit scale.

Also, the optical receiving device 2 according to the first embodiment, in which the nonlinear compensation units 216 are added between IFFT and FFT processes needed for compensation for band division, has an excellent feature that enables high-accuracy distortion compensation without needing much increase in a circuit scale.

Second Embodiment

Figure 5:
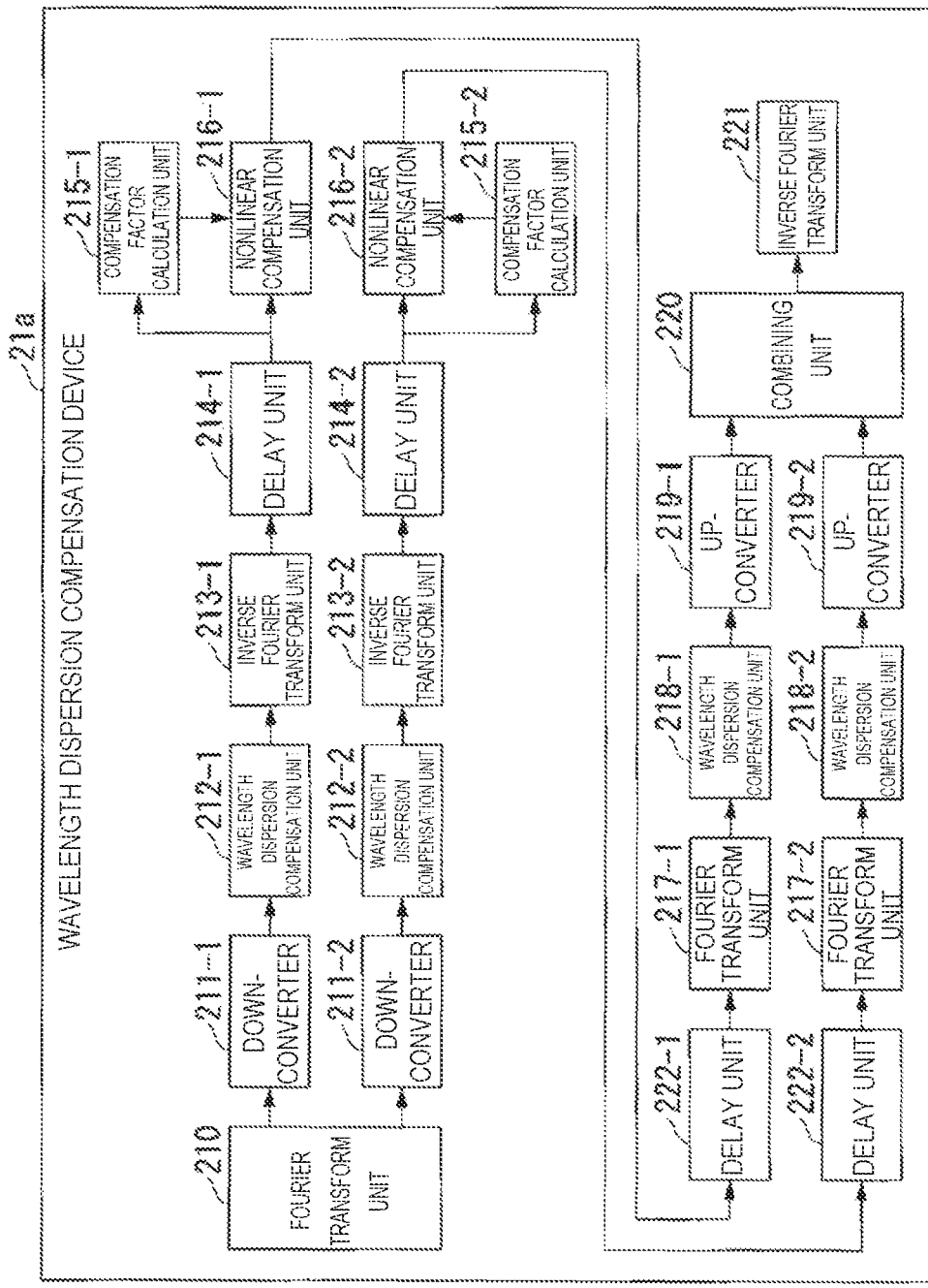
FIG. 5 is a schematic block diagram showing a functional configuration of a wavelength dispersion compensation device according to a second embodiment.

FIG. 5 is a schematic block diagram showing a functional configuration of a wavelength dispersion compensation device 21a according to a second embodiment.

The wavelength dispersion compensation device 21a includes a Fourier transform unit 210, downconverters 211-1 and 211-2, wavelength dispersion compensation units 212-1 and 212-2, inverse Fourier transform units 213-1 and 213-2, delay units 214-1 and 214-2, compensation factor calculation units 215-1 and 215-2, nonlinear compensation units 216-1 and 216-2, Fourier transform units 217-1 and 217-2, wavelength dispersion compensation units 218-1 and 218-2, upconverters 219-1 and 219-2, a combining unit 220, an inverse Fourier transform unit 221, and delay units 222-1 and 222-2.

The configuration of the wavelength dispersion compensation device 21a differs from that of the wavelength dispersion compensation device 21 in that the delay units 222-1 and 222-2 are provided additionally. In the rest of the configuration, the wavelength dispersion compensation device 21a is similar to the wavelength dispersion compensation device 21. Thus, the delay units 222-1 and 222-2 will be described without going into a full description of the wavelength dispersion compensation device 21a.

The delay unit 222-1 assigns delays to the split processing blocks compensated for a nonlinear optical effect and outputted from the nonlinear compensation unit 216-1 and matches timing along the time axis between the plural split processing blocks. The delay unit 222-1 is provided between the nonlinear compensation unit 216-1 and Fourier transform unit 217-1. A reason why the delay unit 222-1 is provided in a succeeding stage of the nonlinear compensation unit 216-1 is to adjust a relationship of wavelength dispersion (e.g., equalize the wavelength dispersion) between sub-bands during nonlinear compensation.

The delay unit 222-2 assigns delays to the split processing blocks compensated for a nonlinear optical effect and outputted from the nonlinear compensation unit 216-2 and matches timing along the time axis between the plural split processing blocks. The delay unit 222-2 is provided between the nonlinear compensation unit 216-2 and Fourier transform unit 217-2. The delay units 222-1 and 222-2 are a form of a second delay unit.

FIGS. 6(A) to 6(H) are conceptual drawings for explaining processes of the wavelength dispersion compensation device 21a according to the second embodiment.

Figure 6:
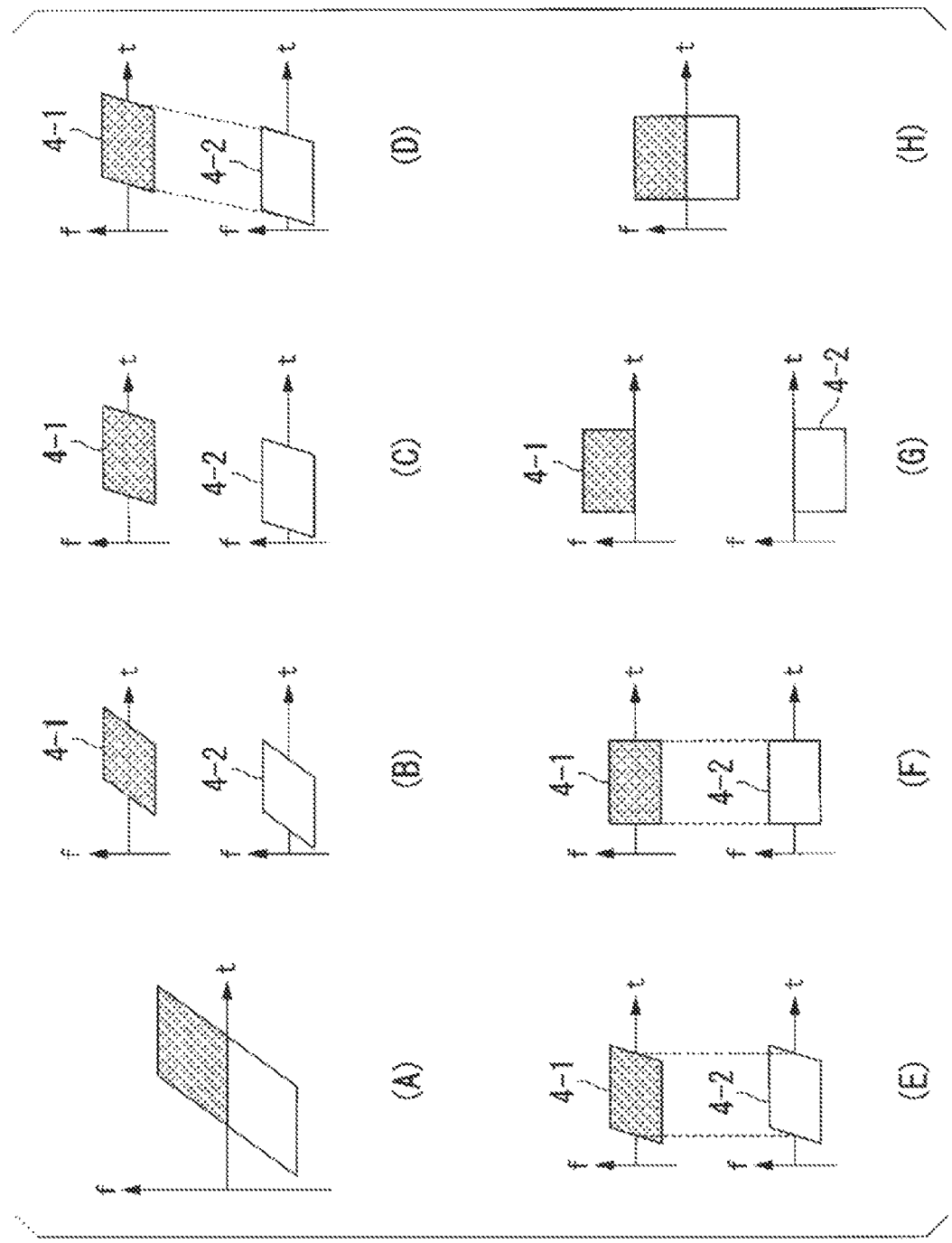
FIGS. 6(A) to 6(H) are conceptual drawings for explaining processes of the wavelength dispersion compensation device according to the second embodiment.

Here, eight diagrams (FIGS. 6(A) to 6(H)) are shown to illustrate processes of the wavelength dispersion compensation device 21a. FIG. 6(A) is a diagram showing a digital receive signal received by the optical receiving device 2. Due to wavelength dispersion, the receive signal is propagated at speed varying with the frequency, and consequently delays occur almost linearly with increases in the frequency, resulting in a shape like a parallelogram as shown in FIG. 6(A).

FIG. 6(B) is a diagram showing split processing blocks 4-1 and 4-2 downconvertered by the downconverters 211-1 and 211-2. The split processing blocks 4-1 and 4-2 are generated as a result of frequency band division performed by the Fourier transform unit 210. FIGS. 6(A) to 6(H) show examples in which a frequency band is divided into two parts.

FIG. 6(C) is a diagram showing split processing blocks 4-1 and 4-2 compensated for wavelength dispersion by the wavelength dispersion compensation units 212-1 and 212-2. FIG. 6(C) shows an example in which half the amount of wavelength dispersion is compensated for by the wavelength dispersion compensation units 212-1 and 212-2.

FIG. 6(D) is a diagram showing split processing blocks 4-1 and 4-2 compensated for a nonlinear optical effect by the nonlinear compensation units 216-1 and 216-2. In the state shown in FIG. 6(D), the nonlinear compensation units 216-1 and 216-2 make compensations such that wavelength dispersion will match between the bands.

FIG. 6(E) is a diagram showing split processing blocks 4-1 and 4-2 to which delays are assigned by the delay units 222-1 and 222-2. The delay units 222-1 and 222-2 assign delays such that any deviation will be eliminated by wavelength dispersion compensation performed by the wavelength dispersion compensation units 218-1 and 218-2 in a succeeding stage.

FIG. 6(F) is a diagram showing split processing blocks 4-1 and 4-2 compensated for wavelength dispersion by the wavelength dispersion compensation units 218-1 and 218-2. As shown in FIG. 6(F), part left uncompensated by the wavelength dispersion compensation units 212-1 and 212-2 are compensated by the wavelength dispersion compensation units 218-1 and 218-2.

FIG. 6(G) is a diagram showing split processing blocks 4-1 and 4-2 upconverted by the upconverters 219-1 and 219-2.

FIG. 6(H) is a diagram showing an example in which plural split processing blocks are combined by the combining unit 220. As shown in FIG. 6(H), the split processing blocks 4-1 and 4-2 are combined into one processing block by the combining unit 220 so as to be continuous with each other on a frequency axis.

Figure 7:
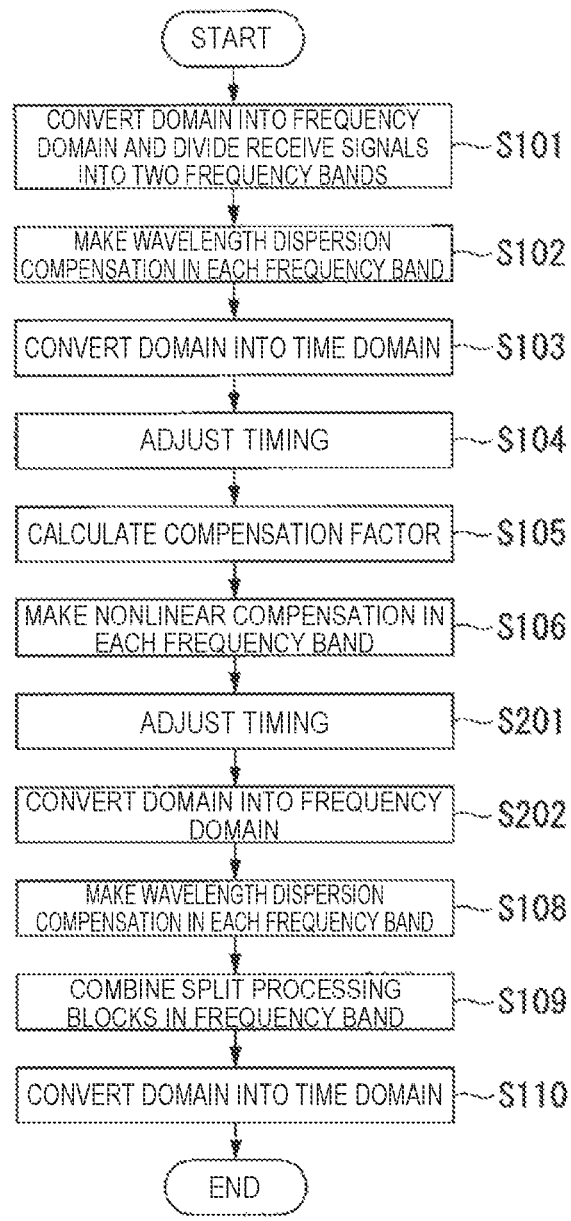
FIG. 7 is a flowchart showing a process flow of the wavelength dispersion compensation device according to the second embodiment.

FIG. 7 is a flowchart showing a process flow of the wavelength dispersion compensation device 21a according to the second embodiment. In FIG. 7, processes similar to those in FIG. 3 are denoted by reference signs similar to those in FIG. 3, and description thereof will be omitted.

The delay unit 222-1 assigns delays to the split processing blocks compensated for a nonlinear optical effect and outputted from the nonlinear compensation unit 216-1 and matches timing along the time axis between the plural split processing blocks (step S201). For example, the delay unit 222-1 assigns delays such that any deviation between the split processing blocks will be eliminated by the wavelength dispersion compensation performed by the wavelength dispersion compensation unit 218-1. The delay unit 222-1 outputs the split processing block to which the delay has been assigned, to the Fourier transform unit 217-1.

As with the delay unit 222-1, the delay unit 222-2 assigns delays to the split processing blocks compensated for a nonlinear optical effect and outputted from the nonlinear compensation unit 216-2 and matches timing along the time axis between the plural split processing blocks. For example, the delay unit 222-2 assigns delays such that any deviation between the split processing blocks will be eliminated by the wavelength dispersion compensation performed by the wavelength dispersion compensation unit 218-2. The delay unit 222-2 outputs the split processing block to which the delay have been assigned, to the Fourier transform unit 217-2.

The optical receiving device 2 according to the second embodiment configured as described above offers effects similar to those of the first embodiment.

Also, with the optical receiving device 2 according to the second embodiment, a delay circuit is added at the succeeding stage of the nonlinear compensation unit 216 in the wavelength dispersion compensation device 21 according to the first embodiment. This allows the optical receiving device 2 according to the second embodiment to adjust a relationship of wavelength dispersion between sub-bands during compensation for the nonlinear optical effect performed by the nonlinear compensation unit 216. Therefore, the optical receiving device 2 according to the second embodiment enables higher-accuracy compensation in the process at the succeeding stage. Also, the optical receiving device 2 according to the second embodiment implements a digital backpropagation method using a fewer number of additional circuits in terms of an overall configuration. Thus, the optical receiving device 2 according to the second embodiment can compensate for waveform distortion with high accuracy while limiting the circuit scale.

Third Embodiment

Figure 8:
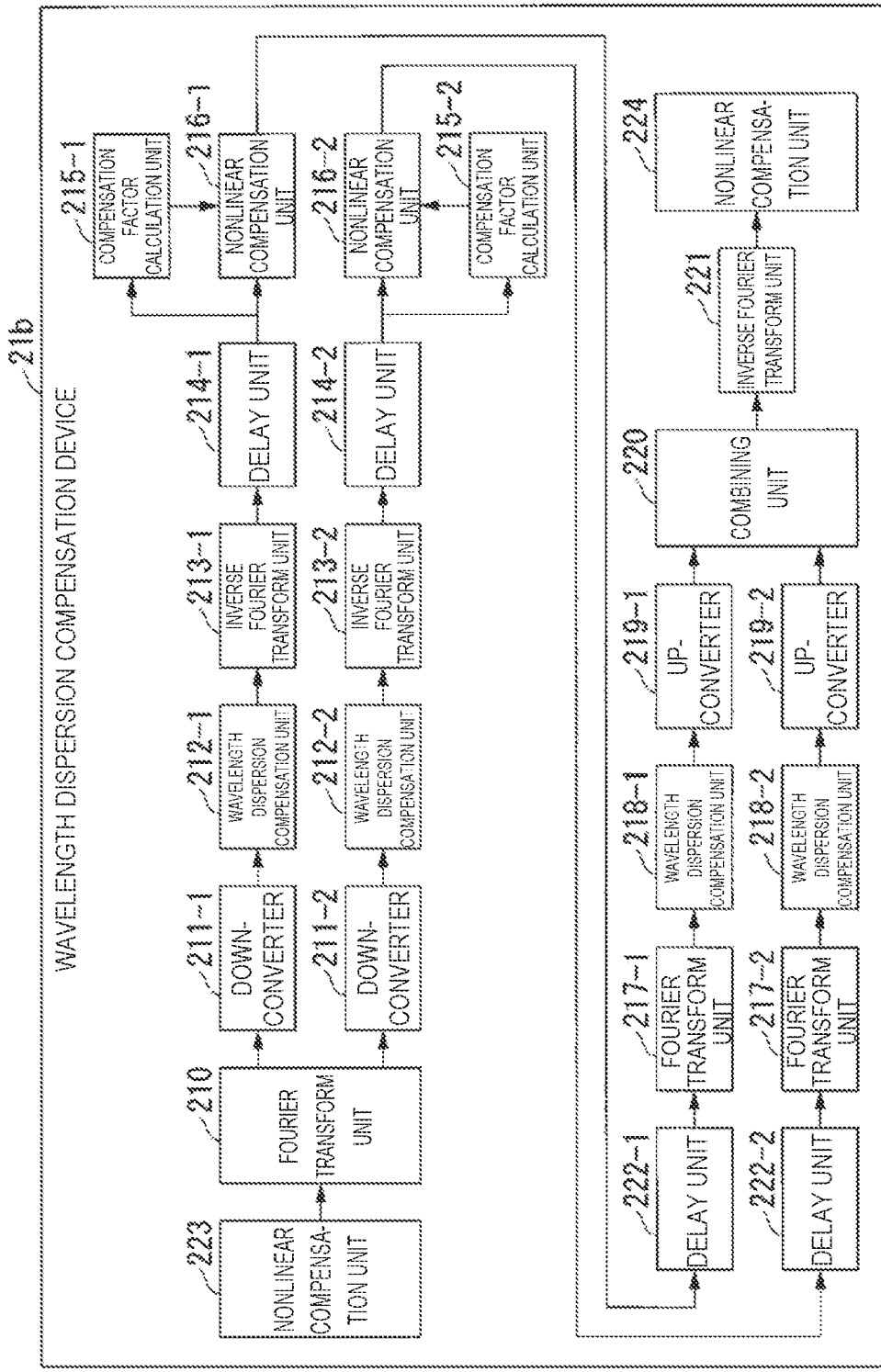
FIG. 8 is a schematic block diagram showing a functional configuration of a wavelength dispersion compensation device according to a third embodiment.

FIG. 8 is a schematic block diagram showing a functional configuration of a wavelength dispersion compensation device 21b according to a third embodiment.

The wavelength dispersion compensation device 21b includes a Fourier transform unit 210, downconverters 211-1 and 211-2, wavelength dispersion compensation units 212-1 and 212-2, inverse Fourier transform units 213-1 and 213-2, delay units 214-1 and 214-2, compensation factor calculation units 215-1 and 215-2, nonlinear compensation units 216-1 and 216-2, Fourier transform units 217-1 and 217-2, wavelength dispersion compensation units 218-1 and 218-2, upconverters 219-1 and 219-2, a combining unit 220, an inverse Fourier transform unit 221, and delay units 222-1 and 222-2, a nonlinear compensation unit 223, and a nonlinear compensation unit 224.

The configuration of the wavelength dispersion compensation device 21b differs from that of the wavelength dispersion compensation device 21a in that the nonlinear compensation unit 223 and nonlinear compensation unit 224 are provided additionally. In the rest of the configuration, the wavelength dispersion compensation device 21b is similar to the wavelength dispersion compensation device 21a. Thus, the nonlinear compensation unit 223 and nonlinear compensation unit 224 will be described without going into a full description of the wavelength dispersion compensation device 21b.

The nonlinear compensation unit 223 compensates the receive signals in the time domain inputted to the wavelength dispersion compensation device 21b for a nonlinear optical effect. The nonlinear compensation unit 223 is provided in a preceding stage of the Fourier transform unit 210. The nonlinear compensation unit 223 is a form of a second nonlinear compensation unit.

The nonlinear compensation unit 224 compensates the receive signals in the time domain outputted from the inverse Fourier transform unit 221 for a nonlinear optical effect. The nonlinear compensation unit 224 is provided in a succeeding stage of the inverse Fourier transform unit 221. The nonlinear compensation unit 223 is a form of a third nonlinear compensation unit.

Figure 9:
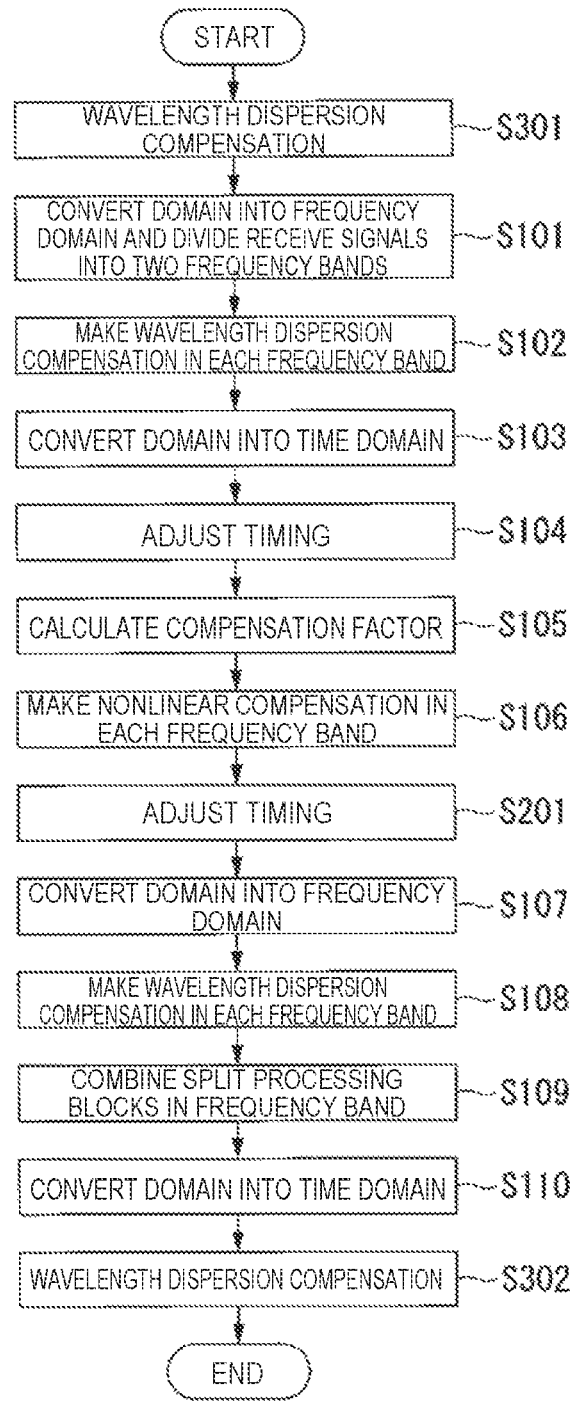
FIG. 9 is a flowchart showing a process flow of the wavelength dispersion compensation device according to the third embodiment.

FIG. 9 is a flowchart showing a process flow of the wavelength dispersion compensation device 21b according to the third embodiment. In FIG. 9, processes similar to those in FIG. 7 are denoted by reference signs similar to those in FIG. 7, and description thereof will be omitted.

The nonlinear compensation unit 223 compensates the receive signals in the time domain inputted to the wavelength dispersion compensation device 21b for a nonlinear optical effect (step S301). The nonlinear compensation unit 223 outputs the receive signals in the time domain compensated for the nonlinear optical effect to the Fourier transform unit 210. Subsequently, the processes of step S101 to step S110 are performed. The nonlinear compensation unit 224 compensates the receive signals in the time domain outputted from the inverse Fourier transform unit 221 for a nonlinear optical effect (step S302).

The optical receiving device 2 according to the third embodiment configured as described above offers effects similar to those of the first embodiment and second embodiment.

Also, the optical receiving device 2 according to the third embodiment has the nonlinear compensation unit 223 and nonlinear compensation unit 224 provided, respectively, in the first stage and last stage of the wavelength dispersion compensation device 21b. Consequently, if dispersion compensation and nonlinear compensation make up one step, the present embodiment can implement compensation by a 2.5-step digital backpropagation method. To implement compensation by a 2.5-step digital backpropagation method using a conventional method, a large number of Fourier transform units and inverse Fourier transform units are needed in order to repeat FFT and IFFT, but the optical receiving device 2 according to the third embodiment can implement compensation using a smaller circuit configuration. Thus, the optical receiving device 2 according to the third embodiment can compensate for waveform distortion with high accuracy while limiting the circuit scale.

Fourth Embodiment

Figure 10:
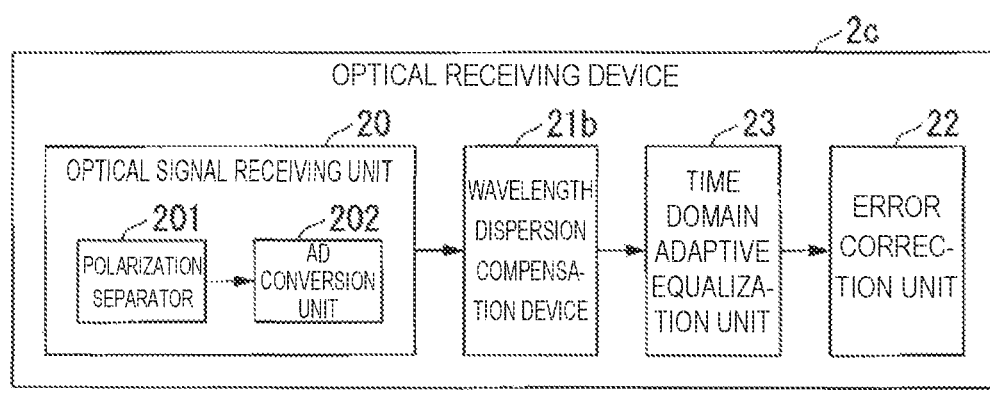
FIG. 10 is a schematic block diagram showing a functional configuration of an optical receiving device according to a fourth embodiment.

FIG. 10 is a schematic block diagram showing a functional configuration of an optical receiving device 2c according to a fourth embodiment.

The optical receiving device 2c includes an optical signal receiving unit 20, a wavelength dispersion compensation device 21b, an error correction unit 22, and a time domain adaptive equalization unit 23.

The configuration of the optical receiving device 2c differs from that of the optical receiving device 2b in that the time domain adaptive equalization unit 23 is provided additionally. In the rest of the configuration, the wavelength dispersion compensation device 21c is similar to the optical receiving device 2b. Thus, the time domain adaptive equalization unit 23 will be described without going into a full description of the optical receiving device 2c.

The time domain adaptive equalization unit 23 performs an adaptive equalization process on the receive signal compensated for wavelength dispersion by the wavelength dispersion compensation device 21b and thereby compensates the receive signal for distortion.

The optical receiving device 2c according to the fourth embodiment does not make the wavelength dispersion compensation device 21b compensate for the total amount of wavelength dispersion caused on the optical transmission line 3 and leaves components of wavelength dispersion as they are. Then, the remaining components of wavelength dispersion are compensated for by the time domain adaptive equalization unit 23. Therefore, a wavelength dispersion compensation is made by the wavelength dispersion compensation device 21b by deducting the amount of compensation to be made by the time domain adaptive equalization unit 23. The amounts of compensation made by the wavelength dispersion compensation units 212 and wavelength dispersion compensation units 218 are set statically.

FIG. 11 is a flowchart showing a process flow of the optical receiving device 2c according to the fourth embodiment. In FIG. 11, processes similar to those in FIG. 9 are denoted by reference signs similar to those in FIG. 9, and description thereof will be omitted.

When the process of step S302 is performed, the time domain adaptive equalization unit 23 captures the receive signal compensated for wavelength dispersion from the wavelength dispersion compensation device 21. The time domain adaptive equalization unit 23 performs an adaptive equalization process on the captured receive signal subjected to wavelength dispersion compensation (step S401). More specifically, the time domain adaptive equalization unit 23 performs an adaptive equalization process to compensate for distortion of the receive signal or distortion in a transfer function of an electrical or optical device due to polarization fluctuation. Polarization separation is done by the time domain adaptive equalization unit 23. Possible methods for this includes a method that minimizes a difference between a training signal or pilot signal inserted on a sending side and the signal on a receiving side.

The optical receiving device 2c according to the fourth embodiment configured as described above offers effects similar to those of the first embodiment to third embodiment.

The optical receiving device 2c according to the fourth embodiment does not make the wavelength dispersion compensation device 21b compensate for the total amount of wavelength dispersion caused on the optical transmission line 3 and leaves wavelength dispersion as it is, and then, makes the time domain adaptive equalization unit 23 compensate for the remaining components of the wavelength dispersion. Consequently, if dispersion compensation and nonlinear compensation make up one step, the present embodiment can implement compensation by a 3-step digital backpropagation method. To implement compensation by a 3-step digital backpropagation method using a conventional method, a large number of Fourier transform units and inverse Fourier transform units are needed in order to repeat FFT and IFFT, but the optical receiving device 2c according to the fourth embodiment includes the time domain adaptive equalization unit 23 instead of increasing the number of Fourier transform units and inverse Fourier transform units. Consequently, the optical receiving device 2c according to the fourth embodiment can implement compensation by a 3-step digital backpropagation method with a smaller circuit configuration than the conventional method. Thus, the optical receiving device 2c according to the fourth embodiment can compensate for waveform distortion with high accuracy while limiting the circuit scale.

Variation

The optical receiving device 2c may be configured to include the wavelength dispersion compensation device 21 or wavelength dispersion compensation device 21a instead of the wavelength dispersion compensation device 21b.

A variation common to the above embodiments will be described below.

The above embodiments may be configured such that a wavelength dispersion compensator 40-1 will capture a split processing block in a negative frequency band and that a wavelength dispersion compensator 40-2 will capture a split processing block in a positive frequency band.

Whereas in the above embodiments, the Fourier transform unit 210 divides a frequency band into two frequency bands—a positive frequency band and negative frequency band—with reference to a center frequency, the frequency band may be divided into two with reference to a frequency other than the center frequency or may be divided into three or more.

In the above embodiments, in dividing the frequency band into split processing blocks, the Fourier transform unit 210 may divide the frequency band into equal parts or into unequal parts at any desired ratio.

In the above embodiments, the wavelength dispersion compensation unit 212, inverse Fourier transform unit 213, delay unit 214, nonlinear compensation unit 216, compensation factor calculation unit 215, delay unit 222, and Fourier transform unit 217 may perform repetitive processes. In that case, compensations can be made in any number of steps. Even under this condition, a digital backpropagation method can be implemented with a relatively smaller circuit scale than when steps are repeated under a Non-divide condition.

The optical transmission device 1 and optical receiving devices 2 and 2c in the embodiments described above may be implemented by a computer. In that case, programs that implement these functions may be recorded on a computer-readable recording medium and read and executed by a computer system to implement the devices. It is assumed that the "computer system" as referred to herein includes an OS and hardware such as peripheral devices. Also, the "computer-readable recording medium" refers to a portable medium such as a flexible disk, magneto-optical disk, ROM, or CD-ROM, or a storage device, built into the computer system, such as a hard disk. Furthermore, the "computer-readable recording medium" may include a recording medium that dynamically holds a program for a short time when a program is transmitted through a network such as the Internet or a communications line such as a telephone line and a recording medium such as a volatile memory that holds the program in the computer system for a set amount of time when the computer system is acting as a server or client during the transmission. The program may be designed to implement only part of the functions described above or implement the functions described above in conjunction with a program prestored in the computer system. Alternatively, the above functions may be implemented using a programmable logic device such as a FPGA (Field Programmable Gate Array).

Embodiments of the present invention have been described in detail above with reference to the accompanying drawings, but specific configuration of the present invention is not limited to the embodiments described above and design changes may be made without departing from the spirit and scope of the invention.

REFERENCE SIGNS LIST

1 Optical transmission device
2 Optical receiving device
3 Optical transmission line
10 Data generating unit
11 Optical signal transmission unit
20 Optical signal receiving unit
21 Wavelength dispersion compensation device
22 Error correction unit
23 Time domain adaptive equalization unit
201 Polarization separator
202 AD conversion unit
210 Fourier transform unit
211-1, 211-2 Downconverter
212-1, 212-2 Wavelength dispersion compensation unit
213-1, 213-2 Inverse Fourier transform unit
214-1, 214-2 Delay unit
215-1, 215-2 Compensation factor calculation unit
216-1, 216-2 Nonlinear compensation unit
217-1, 217-2 Fourier transform unit
218-1, 218-2 Wavelength dispersion compensation unit
219-1, 219-2 Upconverter
220 Combining unit
221 Inverse Fourier transform unit
222-1, 222-2 Delay unit
223 Nonlinear compensation unit
224 Nonlinear compensation unit

The invention claimed is:
1. An optical receiving device that divides receive signals obtained by receiving an optical signal using a coherent detection scheme into a plurality of frequency bands, matches timing of the receive signals along a time axis between the frequency bands resulting from the division, performs a combining process of combining the receive signals contained in the plurality of frequency bands, and compensates the receive signals for waveform distortion either before or after the combining process, the optical receiving device comprising:
a first wavelength dispersion compensation unit adapted to compensate the receive signals for waveform distortion in each of the frequency bands resulting from the division;
a first nonlinear compensation unit adapted to compensate the receive signals belonging to each of the frequency bands and timed with each other in a time domain for a nonlinear optical effect; and a second wavelength dispersion compensation unit adapted to compensate the receive signals belonging to each of the frequency bands and compensated for the nonlinear optical effect for wavelength dispersion in each of the frequency bands.

2. The optical receiving device according to claim 1, further comprising:
- a first delay unit adapted to match timing along a time axis between the receive signals in each of the frequency bands in a stage preceding the first nonlinear compensation unit; and
- a second delay unit adapted to match timing along a time axis between the receive signals belonging to each of the frequency bands and compensated for the nonlinear optical effect.

3. The optical receiving device according to claim 1, further comprising:
- a second nonlinear compensation unit adapted to compensate the receive signals for the nonlinear optical effect before the receive signals are divided; and
- a third nonlinear compensation unit adapted to compensate the receive signals for the nonlinear optical effect after the combining process.

4. The optical receiving device according to claim 1, further comprising an adaptive equalization unit adapted to perform an adaptive equalization process on the receive signals after the combining process.

5. A waveform distortion compensation method performed by an optical receiving device that divides receive signals obtained by receiving an optical signal using a coherent detection scheme into a plurality of frequency bands, matches timing of the receive signals along a time axis between the frequency bands resulting from the division, performs a combining process of combining the receive signals contained in the plurality of frequency bands, and compensates the receive signals for waveform distortion either before or after the combining process, the method comprising:
- a first wavelength dispersion compensation step of compensating the receive signals for waveform distortion in each of the frequency bands resulting from the division;
- a first nonlinear compensation step of compensating the receive signals belonging to each of the frequency bands and timed with each other in a time domain for a nonlinear optical effect; and
- a second wavelength dispersion compensation step of compensating the receive signals belonging to each of the frequency bands and compensated for the nonlinear optical effect for wavelength dispersion in each of the frequency bands.

* * * * *